(12) United States Patent
Ryu

(10) Patent No.: US 9,299,161 B2
(45) Date of Patent: Mar. 29, 2016

(54) METHOD AND DEVICE FOR HEAD TRACKING AND COMPUTER-READABLE RECORDING MEDIUM

(71) Applicant: Woo Ju Ryu, Seongnam-si (KR)

(72) Inventor: Woo Ju Ryu, Seongnam-si (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,709

(22) PCT Filed: Feb. 21, 2013

(86) PCT No.: PCT/KR2013/001384
§ 371 (c)(1),
(2) Date: Dec. 27, 2013

(87) PCT Pub. No.: WO2013/125876
PCT Pub. Date: Aug. 29, 2013

(65) Prior Publication Data
US 2014/0193035 A1 Jul. 10, 2014

(30) Foreign Application Priority Data

Feb. 23, 2012 (KR) .................. 10-2012-0018736

(51) Int. Cl.
*G06T 7/20* (2006.01)
*G06K 9/00* (2006.01)
*G06K 9/62* (2006.01)

(52) U.S. Cl.
CPC .......... *G06T 7/2046* (2013.01); *G06K 9/00261* (2013.01); *G06K 9/00281* (2013.01); *G06K 9/621* (2013.01); *G06T 2207/20081* (2013.01); *G06T 2207/30201* (2013.01)

(58) Field of Classification Search
CPC ...................................... G06T 7/2046
USPC ........................................... 382/103
See application file for complete search history.

(56) References Cited

U.S. PATENT DOCUMENTS

2009/0215533 A1* 8/2009 Zalewski et al. ............... 463/32

FOREIGN PATENT DOCUMENTS

| JP | 2000-268161 | 9/2000 |
| JP | 2009-081714 | 4/2009 |
| JP | 2010-244462 | 10/2010 |

OTHER PUBLICATIONS

Brown, L.M.; Ying-Li Tian, "Comparative study of coarse head pose estimation," Motion and Video Computing, 2002. Proceedings. Workshop on , vol., No., pp. 125,130, Dec. 5-6, 2002. Accessed on Mar. 19, 2015 URL: http://ieeexplore.ieee.org/stamp/stamp.jsp?tp=&arnumber=1182224&isnumber=26539.*

(Continued)

*Primary Examiner* — Utpal Shah
*Assistant Examiner* — Kate R Duffy
(74) *Attorney, Agent, or Firm* — Blakely, Sokoloff, Taylor & Zafman LLP

(57) ABSTRACT

A method for performing head tracking is disclosed. The method includes receiving an input of an image including a facial area and tracking a movement of the facial area, including if a rotation angle of a facial area is within a predetermined angle range from a front side, searching for a location change of feature points within a facial area through a comparison with a template learned in advance and if a rotation angle of a facial area is beyond a predetermined angle range from a front side, searching for a location change of feature points within a facial area through a comparison with a facial area image frame previously inputted.

25 Claims, 4 Drawing Sheets

(56) References Cited

OTHER PUBLICATIONS

Kyoungho Choi; Jenq-Neng Hwang, "A real-time system for automatic creation of 3D face models from a video sequence," Acoustics, Speech, and Signal Processing (ICASSP), 2002 IEEE International Conference on , vol. 2, No., pp. II-2121, II-2124, May 13-17, 2002. Accessed on Mar. 19, 2015 URL: http://ieeexplore.ieee.org/stamp/stamp.jsp?tp=&arnumber=5745054&is.*

J. Sung, T. Kanade, and D. Kim "Pose Robust Face Tracking by Combining Active Appearance Models and Cylinder Head Models" Int. J. Comput. Vis., vol. 80, No. 2, pp. 260-274, Nov. 2008. Accessed Mar. 19, 2015 on http://link.springer.com/article/10.1007%2Fs11263-007-0125-1.*

J. Xiao, T. Moriyama, T. Kanade, and J.F. Cohn, "Robust Full Motion Recovery of Head by Dynamic Templates and Re Registration Techniques," Int'l J. Imaging Systems and Technology, vol. 13, No. 1, pp. 85-94, 2003. Accessed on Mar. 19, 2015 http://citeseerx.ist.psu.edu/viewdoc/download?doi=10.1.1.16.3853&rep=rep1&type=pdf.*

PCT Search Report, PCT/KR2013/001384, May 10, 2013, 6 pages.

Sung, J. et al. Pose Robust Face Tracking by Combining Active Appearance Models and Cylinder Head Models. Int'l. Journal of Computer Vision, 2008, vol. 80, No. 2, pp. 260-274.

Ryu, W. et al., "Real-time 3D Head Tracking and Head Gesture Recognition", In: Robot and Human Interactive Comm., 2007, RO-MAN, 2007, pp. 169-172.

Wang, L. et al., "Face Tracking Using Motion-Guided Dynamic Template Matching", In: Fifth Asian Conf. on Computer Vision, 2002, pp. 1-6.

* cited by examiner

METHOD AND DEVICE FOR HEAD TRACKING AND COMPUTER-READABLE RECORDING MEDIUM

The present patent application is a U.S. National Phase Application under 35 U.S.C. 371 of International Application No. PCT/KR2013/001384 filed Feb. 21, 2013, which claims priority from Korean Application No. 10-2012-0018736, filed Feb. 23, 2012, the contents of which are incorporated herein in their entirety by reference.

TECHNICAL FIELD

The present disclosure relates to a method, apparatus, and computer-readable recording medium for head tracking, and more specifically, to a method, apparatus, and computer-readable recording medium for head tracking characterized in that the tracking is performed by detecting a facial area from a 2D image and then estimating the facial area as 3D, where a head location is estimated by using an active appearance model (AAM) algorithm if an angle of the facial area is within a predetermined angle from the front side, and by using a dynamic template technique if the angle of the facial area is beyond the predetermined angle.

BACKGROUND

A face detection technique is one of the fields being researched in many application systems such as moving robots, surveillance systems, interactions between human and robot, and command input using head tracking. Even though it is difficult to detect a face in real time using a current vision technique, this is being actively researched, and progress is being made in image processing techniques due to the development of computer performance.

In particular, since an algorithm for searching a location of a template image from an inputted image has been developed, as disclosed in "An Iterative Image Registration Technique with an Application to Stereo Vision" {Bruce D. Lucas and Takeo Kanade, Proceedings of the 7th International Joint Conference on Artificial Intelligence (IJCAI '81), April, 1981, pp. 674-679}, algorithms for tracking the rotation angle of a face from a 2D image are progressing in various ways.

For the above algorithms, methods such as an active contour model (ACM), an active shape model (ASM), and an active appearance model (AAM) are being employed.

The ACM is also referred to as a snake model because the shape of its searching is similar to the motion of a snake. This model is a deformable model that can track a contour of an object. The algorithm utilized by the ACM model is a non-learning type, and while it can search respective points relatively rapidly using the Euler formula, it is difficult to have confidence in the results due to convergences by image terms and constraint terms, and it is difficult to track the contour at a concavity portion.

The ASM is a technique proposed by Cootes et al. and has characteristics similar to the ACM model. A shape model refers to all geometric information of a certain object's shape, where the location, size, and rotation effects are removed. The ASM that uses this shape model is a method for learning the information of an object appearance, modifying the average shape of the object based on this information, and thereby searching the object in a new image. This method is based on pre-learned knowledge, and therefore the searching is performed while maintaining the shape of the object. Although this method has rapid operation speed, the portions forming the appearance of an object must be searched accurately when searching the object in a new image, and thus it is difficult to search the accurate shape of an object when an image has unclear contours, similarly to the ACM.

The AAM, wherein the ASM technique is improved, is a method for searching an object in an image by using an appearance, which includes object shape information of a conventional ASM and texture information of the object. This method allows for searching the shape and location of an object more accurately by searching a portion that has the most similar texture, based on pre-learned texture information, while maintaining the shape of the object, and using the shape information and texture information of the object.

More specifically, the AAM technique performs an operation for completing the appearance based on the texture information. Concurrently, shape information is collected through the extraction of feature points, and based on this information, an initial shape model is generated. It is possible to organize the AAM model by using the initial shape model and the appearance.

The AAM may be classified into a combined AAM and an independent AAM. The combined AAM algorithm is a learning type and is a technique where the fitting is performed by parameterizing a shape and an appearance as one parameter; however, it has a relatively low fitting speed. The independent AAM algorithm is a learning type, and a shape and an appearance are independent; thus, the length of a vector is prolonged to infinity, and its detection rate is advantageous when compared to the combined AAM.

Such AAM is described in detail in "Active Appearance Models Revisited" Jain Matthews and Simon Baker, International Journal of Computer Vision, Vol. 60, No. 2, November, 2004, pp. 135-164). As explained above, the AAM has a slow operation speed, and thus, it cannot track in real time a facial area which moves as rotating to the left and right quickly (i.e., the movement of a head).

To solve the problem above, a facial area tracking technique using a dynamic template has been developed as disclosed in "Real-Time 3D Head Tracking Under Rapidly Changing Pose, Head Movement and Illumination" (Wooju Ryu and Daijin Kim, Lecture Notes in Computer Science, 2007, Volume 4633/2007, pp. 569-580).

The facial area tracking technique using the dynamic template searches the movement of a facial area (i.e., the movement of a head) by using as a template, an image that was just previously inputted among consecutively inputted images, and comparing differences between the template and the current image. Such a facial area tracking technique using a dynamic template is appropriate for tracking in real time a facial area that is moving to the left and right quickly because the image used as a template is updated in real time. However, once the tracking result has become erroneous, it cannot be restored, and since a facial area is tracked by using an inputted image as a template, error is accumulated for each image that is consecutively inputted, thereby reducing accuracy. In addition, a user has to manually set an initial template when tracking a facial area, and therefore, automatic initialization is restricted.

SUMMARY

Therefore, an object of the present disclosure is to solve the aforementioned problems in the prior art.

In addition, another object of the present disclosure is to provide a method, apparatus, and computer-readable recording medium for head tracking, which compensates for the defects of the active appearance model algorithm and using a dynamic template, and thereby, capable of responding efficiently when a facial area moves quickly by improving the operation speed in tracking the facial area and preventing the phenomenon that accuracy decreases by accumulated error even if the tracking is continuously performed.

The representative configurations of the present disclosure for achieving the aforementioned objects are described below.

According to an aspect of the present disclosure, there is provided a method for performing head tracking, comprising: (a) receiving an input of an image including a facial area; and (b) tracking a movement of the facial area, wherein the step (b) comprises: (b-1) if a rotation angle of a facial area is within a predetermined angle range from a front side, searching for a location change of feature points within a facial area through a comparison with a template learned in advance; and (b-2) if a rotation angle of a facial area is beyond a predetermined angle range from a front side, searching for a location change of feature points within a facial area through a comparison with a facial area image frame previously inputted.

According to another aspect of the present disclosure, there is provided an apparatus for performing head tracking, comprising: an image input unit configured to receive an input of an image including a facial area; and a facial area tracking unit configured to track a movement of the facial area, wherein the facial area tracking unit is configured to perform: a location change search of feature points within a facial area through a comparison with a template learned in advance, if a rotation angle of a facial area is within a predetermined angle range from a front side; and a location change search of feature points within a facial area through a comparison with a facial area image frame previously inputted, if a rotation angle of a facial area is beyond a predetermined angle range from a front side.

According to the present disclosure, the defects of the method of active appearance model algorithm and the method of using a dynamic template are compensated, and thereby, when tracking a facial area, it is possible to track the facial area in real time even if the facial area moves to the left and right quickly by improving the operation speed, and to prevent the phenomenon of decreasing accuracy since errors are not significantly accumulated even if the tracking is continuously performed.

Further, when the facial area tracking is started, it can be automatically initialized without the need for a manual setting of an initial template by a user.

DETAILED DESCRIPTION

Figure 1:
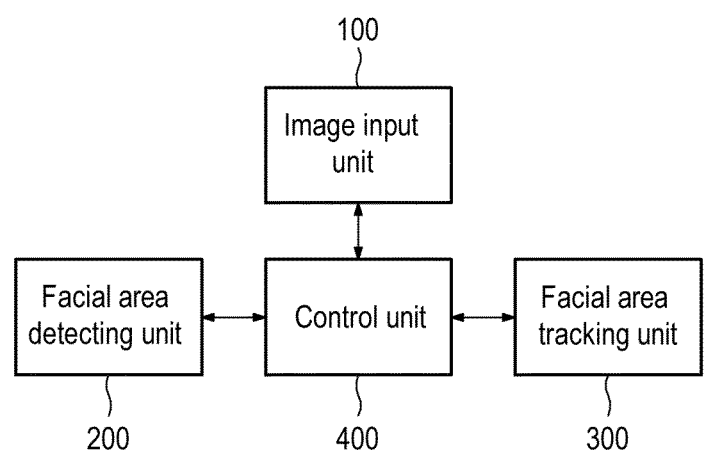
FIG. 1 is a block diagram showing a head tracking apparatus according to an embodiment of the present disclosure.

In the following detailed description of the present disclosure, references are made to the accompanying drawings that show, by way of illustration, specific embodiments in which the present disclosure may be practiced. These embodiments are described in sufficient detail to enable those skilled in the art to practice one or more inventions in the present disclosure. It should be understood that various embodiments of the present disclosure, although different, are not necessarily mutually exclusive. For example, specific features, structures, and characteristics described herein, in connection with one embodiment, may be practiced within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers refer to the same or similar function through many ways.

Hereinafter, various embodiments of the present disclosure will be described in detail with reference to the accompanying drawings in order that those skilled in the art that the present disclosure pertains to can practice the various embodiments easily.

Overall Apparatus Configuration

FIG. 1 is a block diagram showing a head tracking apparatus according to an embodiment of the present disclosure.

The head tracking apparatus may be a digital device. Any portable digital device that has memory means and operation means by a microprocessor, such as a personal computer (e.g., a tablet computer, a laptop computer, etc.), a PDA, a web pad, and a cellular phone, can be employed as a head tracking apparatus according to the present disclosure. A detailed internal configuration of the head tracking apparatus will be further described below.

Referring to FIG. 1, the head tracking apparatus includes an image input unit 100, a facial area detecting unit 200, a facial area tracking unit 300, and a control unit 400. According to an embodiment of the present disclosure, at least a part of the image input unit 100, the facial area detecting unit 200, the facial area tracking unit 300, and the control unit 400 may be program modules. These program modules may be included in the head tracking apparatus as a form of operating system, application modules, and other program modules, and may be physically stored on various known storage devices. These program modules may include a routine, a subroutine, a program, an object, a component, a data structure, and the like that execute specific abstract data types or perform specific tasks as will be described below, but they are not limited to the above.

First, the image input unit 100 performs a function of receiving an input of a 2D image including a facial area from an image pickup device. The 2D image may be consecutive images such as a video. An initially inputted image may include a facial area facing the front side, and the facial area facing the front side may be used for initializing the head tracking apparatus.

Next, the facial area detecting unit 200 may perform a function of initializing by detecting a facial area from the image inputted through the image input unit 100. The process of initializing by detecting the facial area is performed by a process of detecting feature points within the facial area from the inputted 2D image by using face detection (FD), eye detection (ED), and mouse detection (MD) techniques, and a process of estimating an initial 3D location of the facial area from the facial area on the 2D image.

Various conventionally known techniques may be used for the FD technique. For example, it can be performed using feature patterns that are learned and selected by an AdaBoost learning algorithm. A method and apparatus for detecting a face in an image is described in Korean Patent Application No. 10-2011-0114160, entitled "Face detection method, apparatus, and computer-readable recording medium for executing the method," which hereby incorporated by reference in its entirety.

The feature points within the facial area may include at least the centers of both eyes and both end points of a mouth. The facial area detecting unit 200 detects feature points within the facial area from the inputted image and estimates an initial 3D location of the facial area based on the relative locations of the feature points. In order to identify relative locations of the feature points on 3D, a total of six 3D location parameters, which include a rotation angle with respect to X axis (pitching), a rotation angle with respect to Y axis (yawing), a rotation angle with respect to Z axis (rolling), a parallel movement distance with respect to the X axis, a parallel movement distance with respect to the Y axis, and a parallel movement distance with respect to the Z axis, have to be obtained. That is, the facial area detecting unit 200 may perform initialization by detecting the relative locations of the feature points using the above 6 parameters, and estimating an initial 3D location of the facial area based thereon. The process of estimating the initial 3D location of the facial area includes estimating the width and height of a face by using the distance between both eyes, and estimating a roll angle using an angle between a line connecting both eyes and a horizontal line, thereby calculating the rotation angle of the face.

While performing the initialization, if an image having the facial area rotated too much from the front side is inputted, it may not be easy to search the feature points of the facial area from the image and obtain the 6 parameters that the corresponding feature points have. However, if the ranges allowed for the angles of yaw, pitch, and roll are set to be too small, the images that enable the initialization may be restricted and it may cause an inconvenience in using the head tracking apparatus. Based on multiple repetitive simulations conducted on the head tracking apparatus of the present disclosure, it is appreciated that the initialization is possible if a facial area is located within a range of ±22.5° from the front side. Therefore, when performing the initialization, a facial area may have, for example, the angles of yaw, pitch, and roll respectively located within the range of ±22.5° from the front side.

Figure 2:
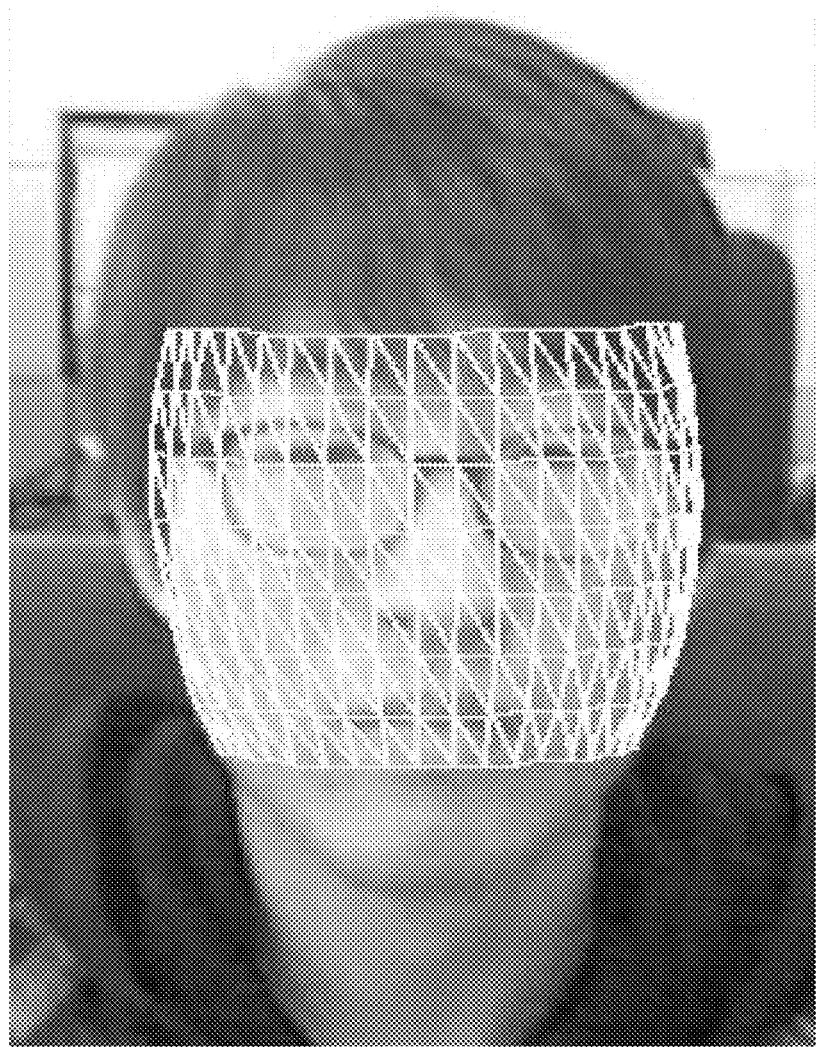
FIG. 2 is a diagram showing the initialization screen of a head tracking apparatus according to an embodiment of the present disclosure.

FIG. 2 is a diagram showing the initialization screen of a head tracking apparatus according to an embodiment of the present disclosure.

Referring to FIG. 2, if a facial area is located within the range of ±22.5° from the front side, the facial area can be modeled as a 3D ellipsoid model. By obtaining the 6 parameters of feature points of the facial area on the 3D ellipsoid model, the 3D locations of the feature points are estimated.

After performing the initialization, the facial area tracking unit 300 may perform, at least once, the process of searching for a location change of feature points within the facial area through a comparison with a template learned in advance. The process of searching for a location change of feature points within the facial area through a comparison with a template learned in advance may be implemented using an active appearance model (AAM) algorithm. If a dynamic template is used, an image frame previous to a currently inputted image frame must be inputted so it is used as a template to allow the tracking to be performed. In light of the above, the Active Appearance Model algorithm is used to perform the tracking in the initialization process, and accordingly, it is possible to prevent the inconvenience of setting the template manually by a user.

As described above, the facial area tracking unit 300 performs a function of, when a facial area moves (i.e. a head moves) in consecutively inputted images, tracking the same and detecting the location of the facial area (i.e., the movement of the head). More specifically, the facial area tracking unit 300 detects the location of a facial area through the process of, if the rotation angle of a facial area is within a predetermined angle range from the front side, searching for the location change of feature points within the facial area through a comparison with a template learned in advance, and through the process of, if the rotation angle of the facial area is beyond the predetermined angle range from the front side, searching for the location change of the feature points within the facial area through a comparison with a facial area image frame previously inputted.

The process of searching for the location change of feature points within the facial area may be conducted by obtaining 6 parameters of the feature points. The 6 parameters may include a rotation angle with respect to X axis (pitching), a rotation angle with respect to Y axis (yawing), a rotation angle with respect to Z axis (rolling), a parallel movement distance with respect to X axis, a parallel movement distance with respect to Y axis, and a parallel movement distance with respect to Z axis.

In some embodiments, the rotation angles may be set so that the angles of yaw, pitch, and roll may be respectively within the range of ±5° from the front side of the facial area.

If the rotation angles of the facial area are within ±5° for all of the yaw, pitch, and roll, the location change of feature points within the facial area is searched through a comparison between the facial area included within the inputted image and a template learned in advance. An active appearance model (AAM) algorithm may be used for the above process.

The active appearance model algorithm models a facial area by separating it into a shape and a texture. Basically, the algorithm is designed so that an average face is constructed using a face learning data and, when a facial area within an image inputted from the outside is given, the parameters of the shape and texture of the average face are changed until it converges to the face similarly.

For the above, the active appearance model algorithm detects the corresponding facial area through an image preprocessing, which includes converting an image provided from the image input unit 100 into grey values and converting integer values that constitute the image into floating values for later face recognition; separates the facial area into a shape and a texture and extracts face feature elements including face feature points, brightness values, etc.; converts a previously stored statistical face model (template) based on the extracted face feature elements and models a synthesized face image that matches with the image forming the facial area; and then conducts a rendering process that combines the synthesized face image formed as above with a mapping source, thereby automatically converting the image provided from the image input unit 100 into a three-dimensional face image.

An active appearance model algorithm as above is advantageous in that various changes of a subject can be represented flexibly. Therefore, the algorithm is applied and used in a variety of fields including face tracking, face feature point extraction, facial expression recognition, etc.

However, in the active appearance model algorithm, since a model learned in advance is used as a template for each image to track the location of a facial area, the amount of operations becomes great and the speed is slowed down. Therefore, it may be difficult to track a facial area in real time if the facial area moves with high speed or the angle of movement (for example, rotation) is large, and thus, it is not efficient to track the location of a facial area using only the active appearance model algorithm.

Therefore, according to the present disclosure, if one of the yaw, pitch, and roll angles of a facial area is beyond ±5°, the location of the facial area is detected by the process of searching for the location change of the feature points within the facial area through a comparison with a facial area image frame previously inputted. For this purpose, a dynamic template technique may be used.

The dynamic template technique is a technique that searches the movement of a facial area by using as a template, an image that was just previously inputted among consecutively inputted images, and comparing differences between the template and the current image. Such a facial area tracking technique using a dynamic template is appropriate for tracking in real time a facial area that is moving to the left and right quickly (or a facial area that is rotating by a large angle) because the image used as a template is updated in real time. Therefore, if one of the yaw, pitch, and roll angles of a facial area is beyond ±5°, the facial area can be assumed as moving quickly and widely, and accordingly, the dynamic template technique may be used to compensate the defect of the active appearance model, since the dynamic template technique has a relatively small amount of operations and fast speed as compared to the active appearance model.

In some embodiments, since the dynamic template technique uses a previously inputted image as a template, once the tracking result goes wrong, it cannot be restored, and error generated as tracking each image is accumulated, thereby reducing accuracy. However, according to the present disclosure, if one of the yaw, pitch, and roll angles of a facial area changes from the range beyond ±5° to the range within ±5°, an active appearance model algorithm is used instead of the dynamic template technique to track the movement of the facial area, and therefore, the error accumulated while using the dynamic template is removed by using the active appearance model algorithm, and as a result, it is possible to implement a more accurate tracking.

Figure 3:
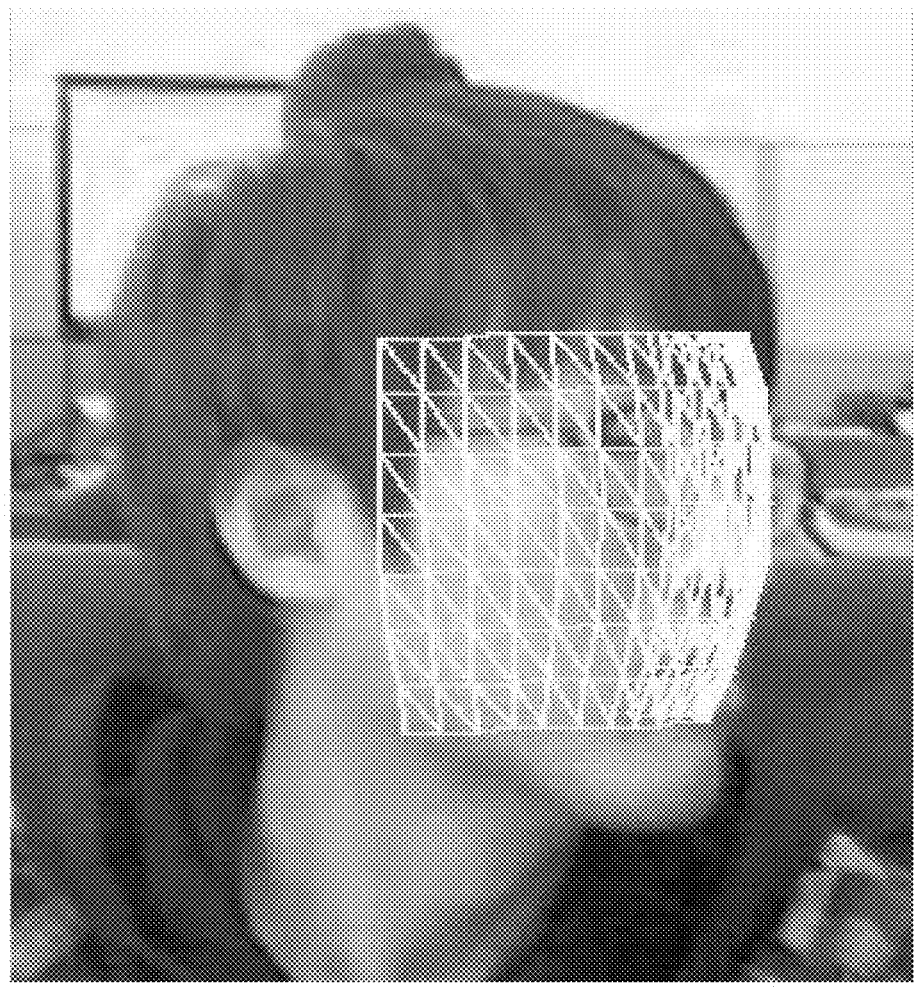
FIG. 3 is a diagram showing the tracking screen of a head tracking apparatus according to an embodiment of the present disclosure.

FIG. 3 is a diagram showing the tracking screen of a head tracking apparatus according to an embodiment of the present disclosure.

Referring to FIG. 3, when a facial area rotates from the front side, if the facial area is within the range of ±5° from the front side, the active appearance model algorithm is used to perform the tracking, and if it is beyond the range of ±5°, a dynamic template technique is used to perform the tracking. When the tracking is performed, a 3D ellipsoid model is rotated to match the facial area as the facial area rotates, and the 3D locations of the feature points are estimated by obtaining the 6 parameters of the feature points of the facial area on the 3D ellipsoid model.

Finally, the control unit 400 performs a function of controlling a data flow among the image input unit 100, the facial area detecting unit 200, and the facial area tracking unit 300. That is, the control unit 400 controls data flow between the respective components and thereby controls the image input unit 100, the facial area detecting unit 200, and the facial area tracking unit 300 to perform their own functions, respectively.

Figure 4:
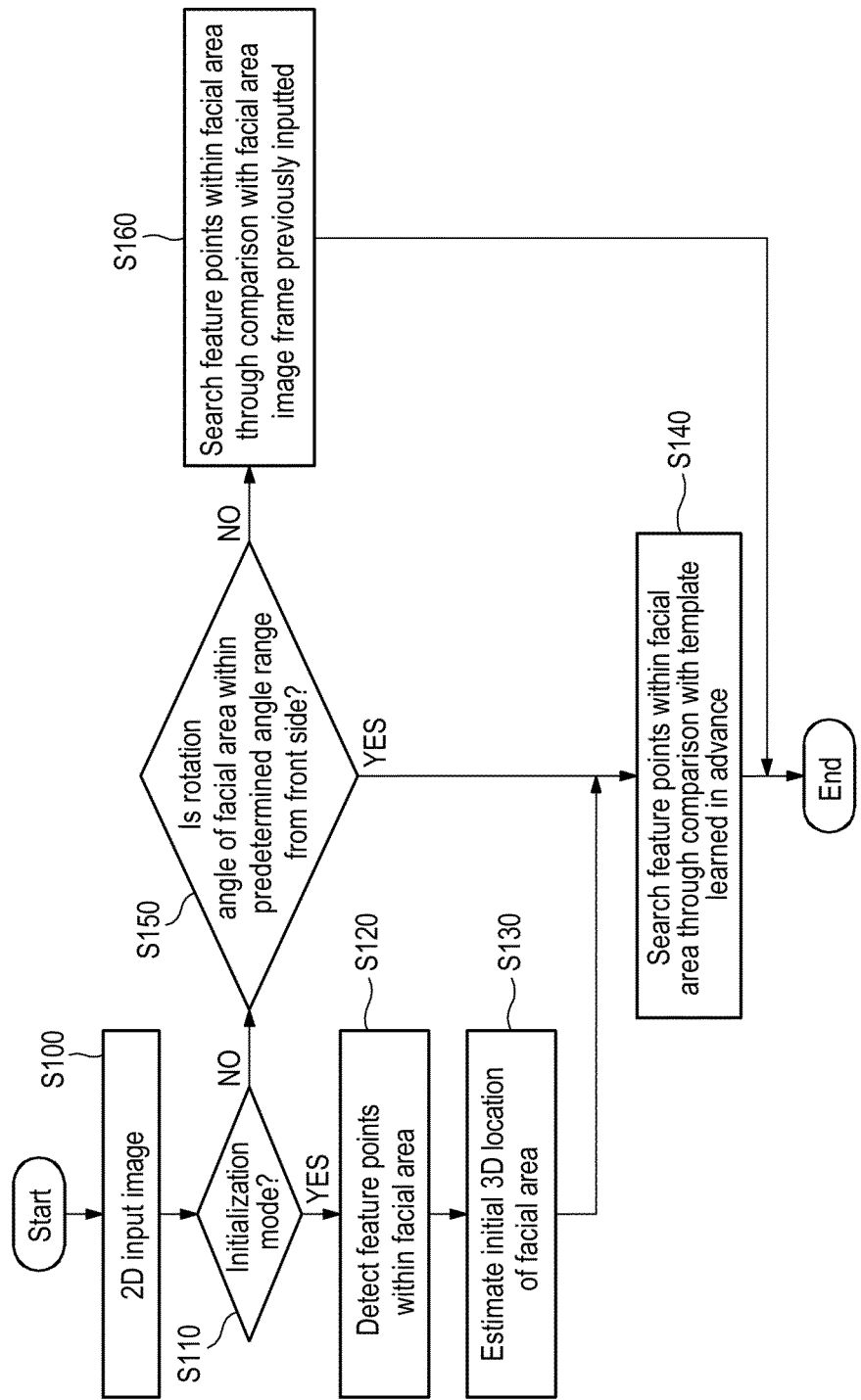
FIG. 4 is a flow chart explaining a head tracking method according to an embodiment of the present disclosure.

FIG. 4 is a flow chart explaining a head tracking method according to an embodiment of the present disclosure.

Referring to FIG. 4, first, an input of a 2D image including a facial area is received through the image input unit 100 (S100). Next, it is determined whether the head tracking apparatus operates in an initialization mode (S110). If the head tracking apparatus operates in the initialization mode, feature points within the facial area are detected using the FD, ED, and MD techniques (S120) and an initial 3D location of the facial area is estimated from the facial area on the 2D image (S130). When the initialization is completed as above, a location change of the feature points within the facial area is searched through a comparison with a template learned in advance (S140). The process of searching the location change of the feature points within the facial area through a comparison with a template learned in advance may be implemented using an active appearance model (AAM) algorithm.

In some embodiments, if the head tracking apparatus does not operate in the initialization mode in the step S110, it is determined whether the rotation angle of the facial area is within a predetermined angle range from the front side (S150). The rotation angle may be determined by the criterion of whether the angles of yaw, pitch, and roll are respectively within the range of ±5°. If the rotation angle of the facial area is within the predetermined angle range from the front side, the process proceeds to step S140 where the location change of the feature points within the facial area is searched through a comparison with a template learned in advance. However, if the rotation angle of the facial area is beyond the predetermined angle range from the front side, the location change of the feature points within the facial area is searched through a comparison with a facial area image frame previously inputted (S160).

The embodiments according to the present disclosure described above can be implemented in the form of program instructions that are executable through various computer components, and be recorded in a computer-readable recording medium. The computer-readable recording medium may include a program instruction, a data file, a data structure, and the like, solely or in a combined manner. The program instructions recorded in the computer-readable recording medium may be the instructions specially designed and configured for the present disclosure or the instructions known to and used by those skilled in the art of the computer software field. Examples of the computer-readable recording medium include: a magnetic medium, such as a hard disk, a floppy disk, and a magnetic tape; an optical recording medium, such as a CD-ROM and a DVD; a magneto-optical medium, such as a floptical disk; and a hardware device specially configured to store and execute program instructions, such as a ROM, a RAM, a flash memory, and the like. The program instructions include, for example, a high-level language code that can be executed by a computer using an interpreter or the like, as well as a machine code such as the code generated by a compiler. The hardware devices can be configured to operate as one or more software modules in order to perform the processing according to the present disclosure, and vice versa.

Although the present disclosure has been described in the foregoing by way of specific particulars such as specific components, as well as finite embodiments and drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the above-described embodiments, but the appended claims and what are modified equally or equivalently thereto will be considered to fall within the scopes of the present disclosure.

INDUSTRIAL APPLICABILITY

The present disclosure is applicable to a head tracking apparatus and the like.

The invention claimed is:

1. A method for performing head tracking, comprising:
receiving an input of at least two images including a facial area, wherein the at least two images include a first and a second image; and tracking a movement of the facial area, comprising:
comparing a rotation angle of the facial area, of at least the second image, with a predetermined angle range;
if the rotation angle of the facial area is within the predetermined angle range from a front side, searching for a location change of feature points within the facial area through a comparison with a template learned in advance; and
if the rotation angle of the facial area is beyond the predetermined angle range from the front side, searching for a location change of feature points within the facial area through a comparison with the facial area of the at least first image frame previously inputted.

2. The method of claim 1, further comprising:
initializing by detecting a facial area from an inputted image.

3. The method of claim 2, wherein the step of initializing by detecting the facial area from the inputted image comprises:
detecting feature points within a facial area using face detection (FD), eye detection (ED) and mouse detection (MD) techniques from an inputted 2D image; and
estimating an initial 3D location of a facial area from a facial area on the 2D image.

4. The method of claim 3, wherein the step of estimating the initial 3D location of the facial area comprises:
estimating width and height of a face by using a distance between both eyes, estimating a roll angle using an angle between a line connecting both eyes and a horizontal line, and thereby calculating a rotation angle of a face.

5. The method of claim 2, wherein, after the step of initializing, a step of searching for a location change of feature points within a facial area through a comparison with the template learned in advance is performed at least once.

6. The method of claim 2, wherein the step of initializing is performed as angles of yaw, pitch, and roll are respectively within a range of ±22.5° from a front side of a facial area.

7. The method of claim 1, wherein the step (b-1) is implemented using an active appearance model (AAM) algorithm.

8. The method of claim 1, wherein the step (b-2) estimates a 3D location of a facial area using a dynamic template technique.

9. The method of claim 1, wherein the steps of searching for the location change of the feature points within the facial area are conducted by obtaining 6 parameters of the feature points.

10. The method of claim 9, wherein the 6 parameters include a rotation angle with respect to X axis (pitching), a rotation angle with respect to Y axis (yawing), a rotation angle with respect to Z axis (rolling), a parallel movement distance with respect to X axis, a parallel movement distance with respect to Y axis, and a parallel movement distance with respect to Z axis.

11. The method of claim 1, wherein the feature points within the facial area include centers of both eyes and both end points of a mouth.

12. An apparatus for performing head tracking, comprising:
an image input unit configured to receive at least two inputs of an image including a facial area, wherein the at least two images include a first and second image; and
a processor to execute:
a facial area tracking unit configured to track a movement of the facial area, of at least the second image, wherein the facial area tracking unit is configured to perform:
a location change search of feature points within a facial area through a comparison with a template learned in advance, if a rotation angle of the facial area is within a predetermined angle range from a front side; and
a location change search of feature points within the facial area through a comparison with the facial area of the at least first image frame previously inputted, if a rotation angle of the facial area is beyond a predetermined angle range from a front side.

13. The apparatus of claim 12, further comprising:
a facial area detecting unit configured to initialize by detecting a facial area from an inputted image.

14. The apparatus of claim 13, wherein the facial area detecting unit being configured to further perform:
a detection of feature points within a facial area using face detection (FD), eye detection (ED) and mouse detection (MD) techniques from an inputted 2D image; and
an estimate of an initial 3D location of a facial area from a facial area on the 2D image.

15. The apparatus of claim 14, wherein the estimate of the initial 3D location of the facial area comprises:
an estimate of a width and height of a face by using a distance between both eyes, an estimate of a roll angle using an angle between a line connecting both eyes and a horizontal line, and thereby calculate a rotation angle of a face.

16. The apparatus of claim 13, wherein, after the initialization is performed, a process of searching for a location change of feature points within a facial area through a comparison with the template learned in advance is performed at least once.

17. The apparatus of claim 12, wherein the location change search of the feature points within the facial area through the comparison with the facial area image frame previously inputted estimates a 3D location of a facial area using a dynamic template technique.

18. The apparatus of claim 12, wherein the location change search of the feature points within the facial area are conducted by obtaining 6 parameters of the feature points.

19. The apparatus of claim 18, wherein the 6 parameters include a rotation angle with respect to X axis (pitching), a rotation angle with respect to Y axis (yawing), a rotation angle with respect to Z axis (rolling), a parallel movement distance with respect to X axis, a parallel movement distance with respect to Y axis, and a parallel movement distance with respect to Z axis.

20. The apparatus of claim 12, wherein the feature points include centers of both eyes and both end points of a mouth.

21. The apparatus of claim 12, wherein the predetermined angle is that angles of yaw, pitch, and roll are respectively ±5° from a front of a facial area.

22. A non-transitory computer readable medium having instructions, when executed by a processor, causes the processor to perform:
receiving an input of at least two images including a facial area; wherein the at least two images include a first and second image and tracking a movement of the facial area, comprising:
comparing a rotation angle of the facial area, of at least the second image, with a predetermined angle range;
if the rotation angle of the facial area is within the predetermined angle range from a front side, searching for a location change of feature points within the facial area through a comparison with a template learned in advance; and if the rotation angle of the facial area is beyond the predetermined angle range from the front side, searching for a location change of feature points within the facial area through a comparison with the facial area of the at least first image frame previously inputted.

23. A computer-readable medium of claim 22, further comprising:

initializing by detecting a facial area from an inputted image.

24. A computer-readable medium of claim 23, wherein the step of initializing by detecting the facial area from the inputted image comprises:

detecting feature points within a facial area using face detection (FD), eye detection (ED) and mouse detection (MD) techniques from an inputted 2D image; and estimating an initial 3D location of a facial area from a facial area on the 2D image.

25. A computer-readable medium of claim 24, wherein the step of estimating the initial 3D location of the facial area comprises:

estimating width and height of a face by using a distance between both eyes, estimating a roll angle using an angle between a line connecting both eyes and a horizontal line, and thereby calculating a rotation angle of a face.

* * * * *